United States Patent
Tkach et al.

(10) Patent No.: US 9,432,999 B1
(45) Date of Patent: Aug. 30, 2016

(54) OPTIMIZATION OF AIRTIME AMONG WI-FI CLIENTS CONNECTED TO AN ACCESS POINT

(71) Applicant: Uwatec Sarl, Luxembourg (LU)

(72) Inventors: Sergei Tkach, Barcelona (ES); Murat Podgoretskiy, Barcelona (ES)

(73) Assignee: Uwatec Sárl, Luxembourg (LU)

( * ) Notice: Subject to any disclaimer, the term of this patent is extended or adjusted under 35 U.S.C. 154(b) by 0 days.

(21) Appl. No.: 15/055,778

(22) Filed: Feb. 29, 2016

Related U.S. Application Data

(60) Provisional application No. 62/257,525, filed on Nov. 19, 2015.

(51) Int. Cl.
| | | |
|---|---|---|
| G01R 31/08 | (2006.01) | |
| H04W 72/04 | (2009.01) | |
| H04W 72/08 | (2009.01) | |
| H04W 28/04 | (2009.01) | |
| H04W 84/12 | (2009.01) | |
| H04W 88/08 | (2009.01) | |

(52) U.S. Cl.
CPC ......... *H04W 72/048* (2013.01); *H04W 28/044* (2013.01); *H04W 72/082* (2013.01); *H04W 72/085* (2013.01); *H04W 84/12* (2013.01); *H04W 88/08* (2013.01)

(58) Field of Classification Search
USPC .................................. 370/252, 328, 338, 401
See application file for complete search history.

(56) References Cited

U.S. PATENT DOCUMENTS

| | | | |
|---|---|---|---|
| 8,483,194 B1* | 7/2013 | Wu | H04W 72/1257 370/230 |
| 2010/0111056 A1* | 5/2010 | Schmitt | H04L 12/5693 370/338 |
| 2012/0201136 A1* | 8/2012 | Williams | H04W 28/0273 370/231 |
| 2014/0078969 A1* | 3/2014 | Guo | H04W 72/1268 370/329 |
| 2014/0269635 A1* | 9/2014 | Shapira | H04W 72/04 370/336 |
| 2016/0043953 A1* | 2/2016 | Ringland | H04W 28/0231 370/230 |
| 2016/0127947 A1* | 5/2016 | Bhanage | H04W 72/08 370/328 |

* cited by examiner

*Primary Examiner* — Ricky Ngo
*Assistant Examiner* — Christine Ng
(74) *Attorney, Agent, or Firm* — Bardmesser Law Group

(57) ABSTRACT

An airtime optimization module monitors each client's connection, and continually calculates airtime for each connection. Then, it shapes the Wi-Fi channel's bandwidth to provide equal airtime to each client connection. The process re-activates every N seconds, for example, every 2 seconds. The airtime optimization module with the optimization algorithm component can be incorporated in the AP firmware or it can reside on a command and control server of any WISP or Enterprise Networks. The airtime optimization module can also be embodied in a software application running under any desktop or mobile operating system. Therefore, the airtime optimization module can be installed to operate at the AP level or at the network level or as an application.

15 Claims, 3 Drawing Sheets

OPTIMIZATION OF AIRTIME AMONG WI-FI CLIENTS CONNECTED TO AN ACCESS POINT

CROSS-REFERENCE TO RELATED APPLICATIONS

This application is a non-provisional of U.S. Patent Provisional Application No. 62/257,525, filed on Nov. 19, 2015, the entire contents of which are hereby incorporated by reference.

BACKGROUND OF THE INVENTION

1. Field of the Invention

This invention relates to a method for controlling and allocating an airtime provided to Wi-Fi clients, and more particularly, to a method for providing an equal distribution of the airtime to the Wi-Fi clients connected to an access point regardless of client devices' channel speed and a connection quality metric.

2. Description of the Related Art

Use of Wi-Fi access point (APs) by several clients often creates a problem of slow Internet (or network) speed experienced by some clients, while the output of the AP is sufficiently high for providing acceptable speed for all active clients. The Wi-Fi access points connected to a number of clients share their available bandwidth based on the individual client device's channel speed and a connection quality metric. The client's channel speed is based on the channel bandwidth (BW) and on the modulation type. The Client Connection Quality (CCQ) is a percentage value, which determines the effective use of the bandwidth with respect to maximum available bandwidth.

A weak client connection (e.g., due to an interference, weak signal, content type in transit, distance from the AP, Wi-Fi device sensitivity, IEEE 802.11 revisions, etc.) can take up a large portion of the airtime at the AP, and, consequently, the AP allocates a shorter airtime to other connected active clients, reducing their send and receive throughput and airtime, effectively slowing down the Wi-Fi network. In this case, although the potential throughput of the AP remaining the same, the perception and the actual performance at the client level decreases dramatically.

An example of the above situation is illustrated in FIG. 1. Client 1 is connected to the AP, but has a low channel speed (CS) due to its data rate and modulation type and a low CCQ value for its connection quality to the AP. In this case, this connection takes a large portion of available airtime to the Access Point, since it holds the transmission opportunity. Client 2 has a higher channel speed capability, due to its data rate and modulation type, as well as much higher CCQ value indicating its higher connection quality. However, Client 2 is slowed down because it receives a lower amount of airtime due to Client's 1 continued transmission session. Client 3, having similar connectivity attributes to Client 2, will be slowed down further, since it will be assigned even less airtime.

As a result, one client (e.g., Client 1) connection transmitting with a poor connection quality will slow down the entire network connection to the AP for the rest of the active clients (e.g., Client 2 and Client 3). This can gradually bring the entire network to halt. Depending on which client grabs the connection first, the network might randomly provide some relief, but the performance of the network will still suffer due to one or many clients having poor connection quality.

Accordingly, it is desired to have a method, which implements an algorithm for monitoring connections for all active clients and automatically recalculating the channel speed and the airtime for each active connection and shaping Wi-Fi channel's bandwidth to provide equal airtime to each active connection. This optimization process needs to be activated each time a new client connects to the AP or whenever a change in client's channel speed and/or CCQ parameters occurs.

SUMMARY OF THE INVENTION

Accordingly, the present invention is related to a method for providing an equal distribution of the airtime to the Wi-Fi clients connected to an access point (AP) regardless of client devices' channel speed and a connection quality metric that substantially obviates one or more of the disadvantages of the related art.

In one embodiment, an airtime optimization module monitors each client's connection, and continually calculates the channel speed and airtime for each active connection. Then, it shapes the Wi-Fi channel's bandwidth to provide equal airtime to each active client connection. The process re-activates every N seconds, for example, every 2 seconds. The airtime optimization module with the optimization algorithm component can be incorporated in the AP firmware or it can reside on a command and control server of any WISP or Enterprise Networks. The airtime optimization module can also be embodied in a software application running under any desktop or mobile operating system. Therefore, the airtime optimization module can be installed to operate at the AP level or at the network level or as an application.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The present invention is directed to a method for providing an equal or fair distribution of the airtime to the Wi-Fi clients connected to an access point (AP) regardless of client devices' channel speed and a connection quality metric. The following definitions are used throughout the description.

AP—Access Point;
Airtime—Access Point assigned airtime to the active client connection;
BS—Base Station;
BW—Bandwidth;
CCQ—Client Connection Quality;
CSMA/CA—Carrier Sense Multiple Access with Collision Avoidance; and
WISP—Wireless Internet Service Provider.

As discussed above, a client's connection (with a low CCQ value and a low channel speed) can occupy a large portion of an airtime to the AP, and, consequently the AP allocates a shorter airtime to other clients' connections. This lowers the throughput and the airtime to other active client connections (with higher channel speeds and CCQ values) and creates congestion in the Wi-Fi network. While the Wi-Fi protocol (IEEE 802.11) is governed by the CSMA/CA protocol, it does not address the problem of network congestion caused by one or more slow clients. The network may randomly provide some relief (based on the end-to-end connection response), but the performance of the network will suffer regardless due to one or more clients with poor CCQ and channel speed.

According to an exemplary embodiment, an airtime optimization module continually recalculates the amount of airtime consumed by the clients based on the channel speed and CCQ, transmit bytes (Tx) and receive bytes (Rx) parameters of each active client's connection every two seconds (for example). This time is selected based on a number of tests. However, any longer or shorter time period can be used for recalculation of the airtimes. Other methods of calculating consumed airtime by the clients can also be used. Then, the airtime optimization module shapes the Wi-Fi channel traffic to provide equal airtime for every data transaction to all active client connections.

The airtime optimization module with the optimization algorithm component can be incorporated in the AP firmware or it can reside on a command and control server of any WISP or Enterprise Networks. Therefore, the airtime optimization module can be installed to operate at the AP level or at the network level. The airtime optimization module can also be embodied in a software application running under any desktop or mobile operating system. The airtime optimization module can also be used with all active devices (clients) that are connected to one or multiple Aps, that work on the same frequency or on overlapping frequencies, and therefore create interference for each other.

Figure 1:
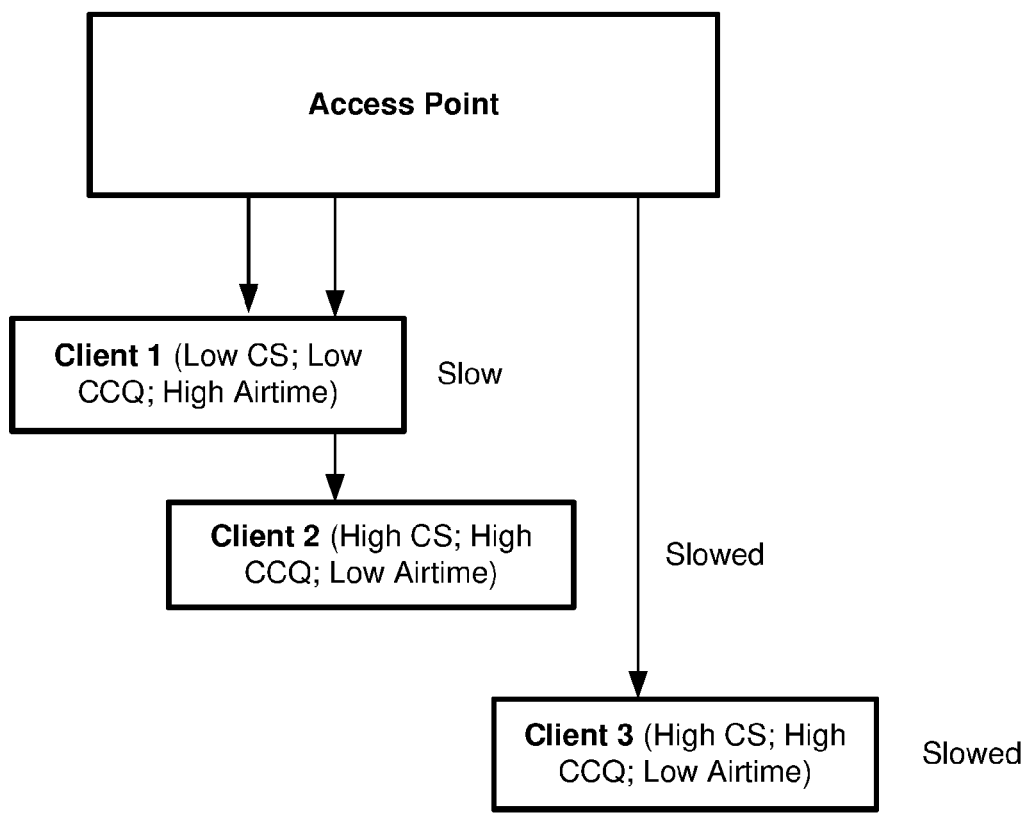
FIG. 1 illustrates an example of a conventional Wi-Fi scenario where one client slows down the entire network.
Figure 2:
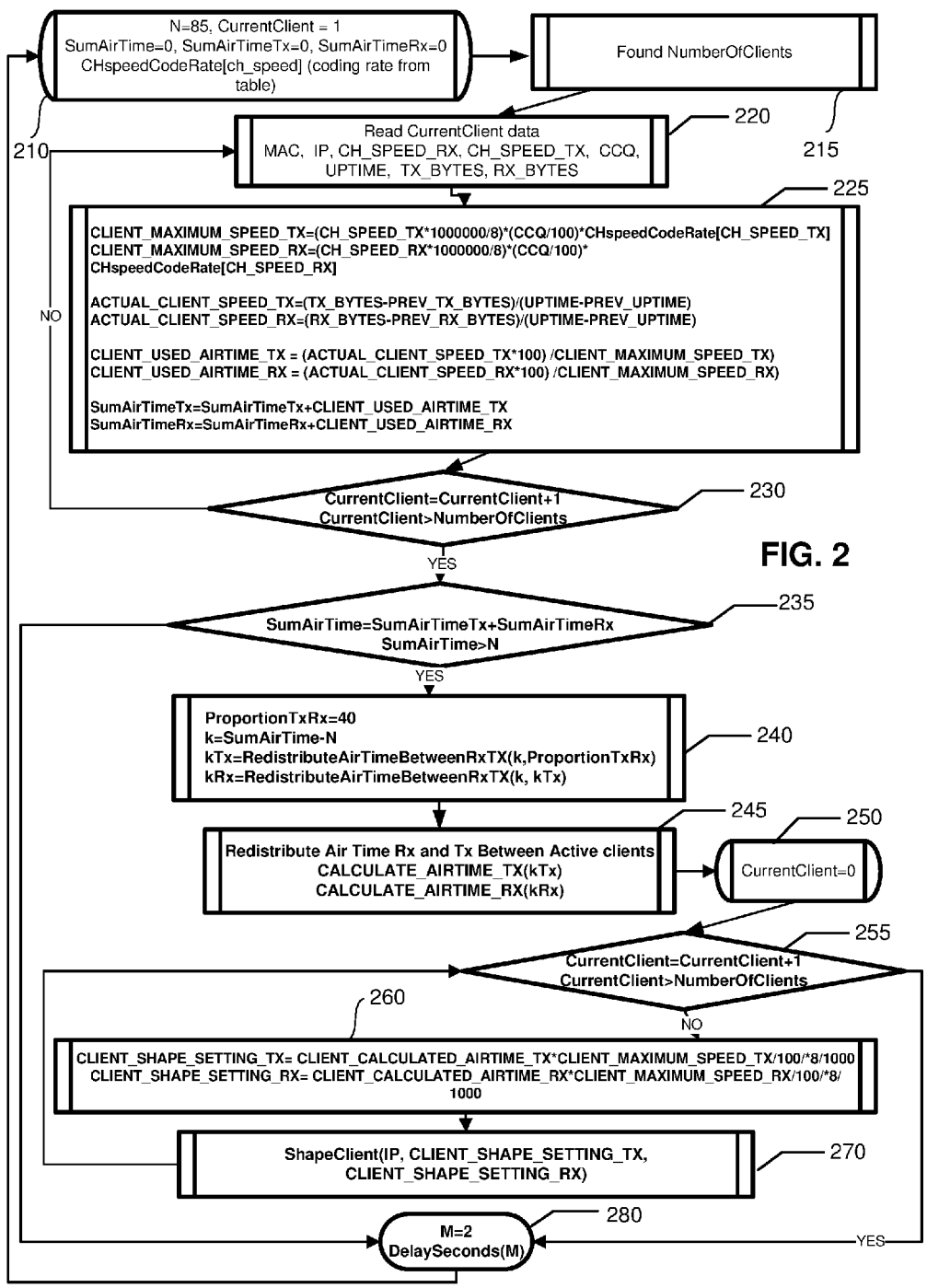
FIG. 2 illustrates a flowchart of an airtime optimization algorithm, in accordance with an exemplary embodiment.

FIG. 2 illustrates a flowchart of an airtime optimization algorithm, in accordance with the exemplary embodiment. The flow chart below describes how all active clients are assigned equal share of the total airtime for both transmit (Tx) and receive (Rx) packets (i.e., upload and download airtime). Every time a client becomes idle, the available airtime is recalculated and other active clients take over the freed up airtime and continue with their data transfers. Since the airtime is recalculated, the addition or removal of devices does not affect the effectiveness of the calculation.

According to the exemplary embodiment, the available airtime that is being shared among all active clients is limited to about 85% of the total airtime provided by the AP. The remaining 15% of the airtime is left available, primarily as an initial margin for new client connections, until the next re-calculation cycle (e.g., less than 2 seconds). According to the exemplary embodiment, the airtime recalculation process takes place every two seconds, and the number of active clients, their channel speed and their connection quality (CCQ) are reassessed within this re-calculation timeframe.

In step 210, the optimization algorithm is initiated. An available airtime percentage is set at N=85. Variables for receive and transmit airtime are set at zero (SumAirTimeTx=0, SumAirTimeRx=0) and channel speed CHspeedCodeRate[ch_speed] (coding rate from table) is set. The process populates a variable NumberOfClients in step 215. In step 220, the process continually reads the following data from the AP:

MAC and IP addresses;
Transmit and receive channel speed (Mbps);
CCQ (Client Connection Quality);
Uptime;
Transmit (Tx) and Received (Rx) byte count.

The above data are used to continually calculate all clients' maximum and actual transmit and receive speeds and all clients' used airtime for transmit and receive in step 225:

A client maximum speed for transmission is calculated as:

CLIENT_MAXIMUM_SPEED_TX=
(CH_SPEED_TX*1000000/8)*(CCQ/100)*
CHspeedCodeRate[CH_SPEED_TX];

A client maximum speed for reception is calculated as:

CLIENT_MAXIMUM_SPEED_RX=
(CH_SPEED_RX*1000000/8)*(CCQ/100)*
CHspeedCodeRate[CH_SPEED_RX];

An actual client speed for transmission is calculated as:

ACTUAL_CLIENT_SPEED_TX=(TX_BYTES−
PREV_TX_BYTES)/(UPTIME−PREV_UPTIME)

An actual client speed for reception is calculated as:

ACTUAL_CLIENT_SPEED_RX=(RX_BYTES−
PREV_RX_BYTES)/(UPTIME−PREV_UPTIME)

A client airtime used for transmission is calculated as:

CLIENT_USED_AIRTIME_TX=(ACTUAL_
CLIENT_SPEED_TX*100)/CLIENT_
MAXIMUM_SPEED_TX);

A client airtime used for reception is calculated as:

CLIENT_USED_AIRTIME_RX=(ACTUAL_
CLIENT_SPEED_RX*100)/CLIENT_
MAXIMUM_SPEED_RX).

Then, an aggregate airtime for transmission is calculated as:

SumAirTimeTx=SumAirTimeTx+CLIENT_USED_
AIRTIME_TX

An aggregate airtime for reception is calculated as:

SumAirTimeRx=SumAirTimeRx+CLIENT_USED_
AIRTIME_RX

In step 230, the process moves to a next client and performs the calculations from step 220 and 225 for this client. Once, it is done for all clients, in step 235, the process checks if the aggregated airtime (Rx and Tx) falls under N (85%). If the aggregated airtime is below 85%, the process goes to step 280 for the re-calculation cycle M (i.e., 2 sec.) and, then, goes back to the beginning of the cycle in step 210. Otherwise, in step 240, the process calculates redistributed air time using coefficients for transmit and receive airtime. The calculated ratio between transmit and receive and also the calculated sum of their airtimes are used to calculate a redistributed airtime for transmit and receive among all active clients in step 245. In step 250, the current client variable is initialized to zero. Then, the process moves to the next client in step 255.

If, in step 255, the client number does not exceed a total number of clients, the client shape settings for Tx and Rx are calculated as follows:

CLIENT_SHAPE_SETTING_TX=CLIENT_CALCULATED_AIRTIME_TX*CLIENT_MAXIMUM_SPEED_TX/100/*8/1000;

CLIENT_SHAPE_SETTING_RX=CLIENT_CALCULATED_AIRTIME_RX*CLIENT_MAXIMUM_SPEED_RX/100/*8/1000.

Then, in step 270 client is shaped using client shape settings as follows: ShapeClient(IP, CLIENT_SHAPE_SETTING_TX, CLIENT_SHAPE_SETTING_RX).

Then, the process moves to the next client in step 255. Thus, each client is shaped in such a way that it receives and equal amount of the airtime over a cycle having a duration M (e.g., 2 seconds). The airtime redistribution is performed at a network level.

According to the exemplary embodiment, this implementation can be used in any AP, using IEEE 802.11 CSMA/CA, or any other collision avoidance protocol using other media (e.g., Copper, POF, etc.), which operates on a half duplex shared media configuration, where all stations transmit and receive on the same channel. An AP, which has an airtime optimization module incorporated in its firmware, provides a reliable equal access to any private or public Wi-Fi client connection and insures a constant and consistent quality of service.

As discussed above, the airtime optimization module monitors both transmit and receive traffic and, advantageously, adjusts the airtime every two seconds for all active clients connected to the AP. The airtime optimization module can be applied to all active clients connected to the AP, that comply with 802.11 a, b, g, n and ac using 2.4 GHz or 5 GHz carrier frequencies. According to the exemplary embodiment, the airtime optimization module can be implemented either within the final AP, at the centralized BS Controller Server, or both depending on the service aspect of the WISP and end user equipment ownership.

An example of a router (or an access point) that may be used in the present invention is illustrated in US Patent Publication No. US20120239916, incorporated herein by reference in its entirety.

As a further option, information about the allocation of airtime can be received from the access point itself (e.g., from a dedicated IC, or calculated by software or firmware).

Figure 3:
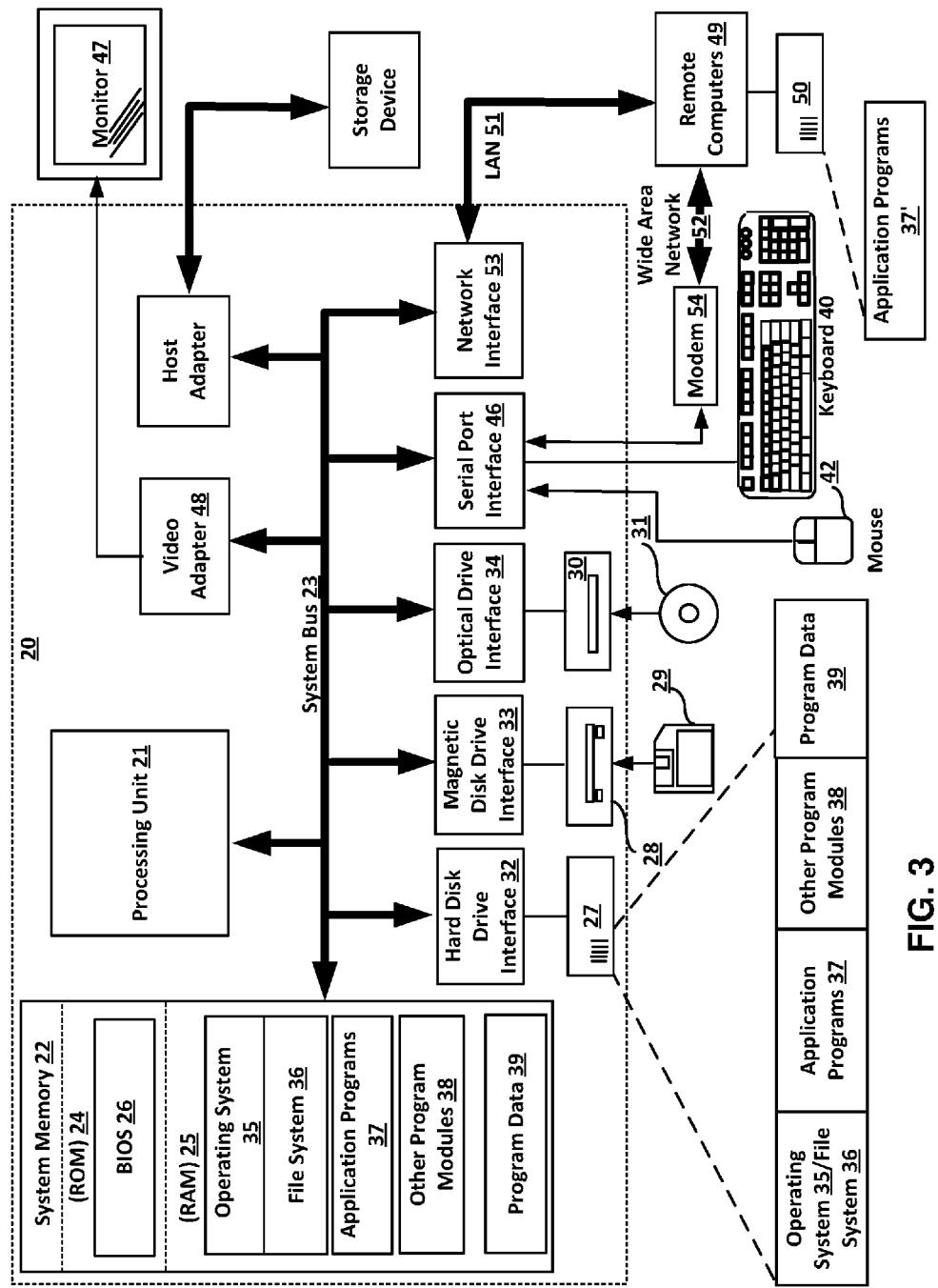
FIG. 3 illustrates a schematic of an exemplary server that can be used for implementation of the invention.

With reference to FIG. 3, an exemplary system for implementing the invention includes a general purpose computing device in the form of a server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the server 104, such as during start-up, is stored in ROM 24.

The server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated server-readable media provide non-volatile storage of server readable instructions, data structures, program modules and other data for the server 20.

Although the exemplary environment described herein employs a hard disk, a removable magnetic disk 29 and a removable optical disk 31, it should be appreciated by those skilled in the art that other types of server readable media that can store data that is accessible by a server, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The server 20 includes a file system 36 associated with or included within the operating system 35, one or more application programs 37, other program modules 38 and program data 39. A user may enter commands and information into the server 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal servers typically include other peripheral output devices (not shown), such as speakers and printers.

The server 20 may operate in a networked environment using logical connections to one or more remote servers 49. The remote server (or servers) 49 may be another server, a server, a router, a network PC, a peer device or other common network node, and typically includes many or all of the elements described above relative to the server 20, although only a memory storage device 50 has been illustrated. The logical connections include a local area network (LAN) 51 and a wide area network (WAN) 52. Such networking environments are commonplace in offices, enterprise-wide server networks, Intranets and the Internet.

When used in a LAN networking environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the server 20, or portions thereof, may be stored in the remote memory storage device. It will be appreciated that the network connections shown are exemplary and other means of establishing a communications link between the servers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for optimization of an airtime among Wi-Fi clients, the system comprising:
    an access point configured to establish connections to a plurality of clients and configured to send and receive data from the clients;
    an airtime optimization module integrated into firmware of the access point or into a controller of the access point or as a separate programmable module that controls the access point, which
    detects all clients connected to the access point;
    continuously monitors clients' connections and reads current client connection data for each of the clients;
    calculates clients' maximum speed based on Client Connection Quality (CCQ) and on Modulation Efficiency Ratio for sending and receiving data based on the current clients' connection data;
    determines clients' actual speed for sending and receiving data based on a number of bytes sent and received;
    calculates clients' used airtime for received and sent data based on the maximum speed and the actual speed, and determines an aggregate used airtime for each client;
    redistributes receive and send airtime between the active clients by prioritizing either airtime for receiving or airtime for sending, for each active client; and
    shapes each of the active clients using shape settings calculated based on the redistributed airtime.

2. The system of claim 1, wherein the current client connection data comprises any of:
    MAC address;
    IP address;
    channel speed for receiving data;
    channel speed for sending data;
    Client Connection Quality (CCQ);
    uptime;
    sent bytes; and
    received bytes.

3. The system of claim 1, wherein the airtime optimization module runs on a base station controller server.

4. The system of claim 1, wherein the Wi-Fi access point uses a collision avoidance protocol, which operates on a half duplex shared media configuration where all stations transmit and receive on the same channel.

5. The system of claim 1, wherein the maximum speed is calculated as follows:

CLIENT_MAXIMUM_SPEED_TX=
        (CH_SPEED_TX*1000000/8)*(CCQ/100)*
        CHspeedCodeRate[CH_SPEED_TX];

CLIENT_MAXIMUM_SPEED_RX=
        (CH_SPEED_RX*1000000/8)*(CCQ/100)*
        CHspeedCodeRate[CH_SPEED_RX].

6. The system of claim 1, wherein the actual speed is determined as follows:

ACTUAL_CLIENT_SPEED_TX=(TX_BYTES-
        PREV_TX_BYTES)/(UPTIME-PREV_UP-
        TIME);

ACTUAL_CLIENT_SPEED_RX=(RX_BYTES-
        PREV_RX_BYTES)/(UPTIME-PREV_UP-
        TIME).

7. The system of claim 1, wherein the used airtime is calculated as follows:

CLIENT_USED_AIRTIME_TX=(ACTUAL_
        CLIENT_SPEED_TX*100)/CLIENT_
        MAXIMUM_SPEED_TX);

CLIENT_USED_AIRTIME_RX=(ACTUAL_
        CLIENT_SPEED_RX*100)/CLIENT_
        MAXIMUM_SPEED_RX).

8. The system of claim 1, wherein the shape settings are calculated as follows:

CLIENT_SHAPE_SETTING_TX=CLIENT_CALCULATED_
        AIRTIME_TX*CLIENT_MAXIMUM_SPEED_
        TX/100/*8/1000

CLIENT_SHAPE_SETTING_RX=CLIENT_CALCULATED_
        AIRTIME_RX*CLIENT_MAXIMUM_SPEED_
        RX/100/*8/1000.

9. A method for optimization of an airtime among Wi-Fi clients connected to an access point, the method comprising:
    connecting a plurality of clients to the access point;
    launching an airtime optimization module integrated into the access point firmware;
    detecting all clients connected to the access point;
    monitoring the clients' connections and reading current client connection data for each of the clients;
    calculating client's maximum speed based on Client Connection Quality (CCQ) and on Modulation Efficiency Ratio for sending and receiving data based on the current clients' connection data;
    determining client's actual speed for sending and receiving data based on a number of bytes sent and received;
    calculating client's used airtime for received and sent data and determining an aggregate used airtime for each client;
    redistributing receive and send airtime between the active clients based on pre-calculated coefficients and a proportional value of sent and received data, and by prioritizing either airtime for receiving or airtime for sending, for each active client; and
    shaping each of the active clients using shape settings calculated based on the redistributed airtime.

10. The method of claim 9, wherein the current client connection data comprises any of:
    MAC address;
    IP address;
    channel speed for receiving data;
    channel speed for sending data;
    Client Connection Quality (CCQ);
    uptime;
    sent bytes; and
    received bytes.

11. The method of claim 9, further comprising launching the airtime optimization module on a base station controller server.

12. The method of claim 9, wherein the maximum speed is calculated as follows:

CLIENT_MAXIMUM_SPEED_TX=
        (CH_SPEED_TX*1000000/8)*(CCQ/100)*
        CHspeedCodeRate[CH_SPEED_TX];

CLIENT_MAXIMUM_SPEED_RX=
        (CH_SPEED_RX*1000000/8)*(CCQ/100)*
        CHspeedCodeRate[CH_SPEED_RX].

13. The method of claim 9, wherein the actual speed is determined as follows:

$$ACTUAL\_CLIENT\_SPEED\_TX = (TX\_BYTES - PREV\_TX\_BYTES)/(UPTIME - PREV\_UPTIME);$$

$$ACTUAL\_CLIENT\_SPEED\_RX = (RX\_BYTES - PREV\_RX\_BYTES)/(UPTIME - PREV\_UPTIME).$$

14. The method of claim 9, wherein the used airtime is calculated as follows:

$$CLIENT\_USED\_AIRTIME\_TX = (ACTUAL\_CLIENT\_SPEED\_TX * 100)/CLIENT\_MAXIMUM\_SPEED\_TX;$$

$$CLIENT\_USED\_AIRTIME\_RX = (ACTUAL\_CLIENT\_SPEED\_RX * 100)/CLIENT\_MAXIMUM\_SPEED\_RX).$$

15. The method of claim 9, wherein the shape settings are calculated as follows:

$$CLIENT\_SHAPE\_SETTING\_TX = CLIENT\_CALCULATED\_AIRTIME\_TX * CLIENT\_MAXIMUM\_SPEED\_TX/100/*8/1000$$

$$CLIENT\_SHAPE\_SETTING\_RX = CLIENT\_CALCULATED\_AIRTIME\_RX * CLIENT\_MAXIMUM\_SPEED\_RX/100/*8/1000.$$

\* \* \* \* \*